US007869962B2

(12) United States Patent
Galliot et al.

(10) Patent No.: US 7,869,962 B2
(45) Date of Patent: Jan. 11, 2011

(54) PROCESS AND DEVICE FOR CONTROLLING THE DEFORMATION OF A METAL PART, IN PARTICULAR FOR REDRESSING A METAL PART

(75) Inventors: André Galliot, Toulouse (FR); Maëva Gelebart, Quiberon (FR); Dominique Vasnier, Le Bigon (FR); Bruno Arzel, Les Sorinieres (FR)

(73) Assignee: Airbus France, Toulouse (FR)

( * ) Notice: Subject to any disclaimer, the term of this patent is extended or adjusted under 35 U.S.C. 154(b) by 243 days.

(21) Appl. No.: 12/106,739

(22) Filed: Apr. 21, 2008

(65) Prior Publication Data

US 2008/0281533 A1    Nov. 13, 2008

(30) Foreign Application Priority Data

May 11, 2007  (FR) ................................. 07 55011

(51) Int. Cl.
    *G01B 5/30* (2006.01)
(52) U.S. Cl. ....................................................... 702/35
(58) Field of Classification Search ............. 702/33–35, 702/41–44, 81; 73/87, 760, 802, 849, 851
    See application file for complete search history.

(56) References Cited

U.S. PATENT DOCUMENTS

| 4,572,001 | A | | 2/1986 | Saimoto et al. ................ 73/765 |
| 5,156,053 | A | * | 10/1992 | Shiraishi et al. ............... 73/849 |
| 6,732,057 | B2 | * | 5/2004 | Hamad ......................... 702/42 |
| 2002/0157196 | A1 | * | 10/2002 | Ouchi et al. .................. 14/77.1 |

FOREIGN PATENT DOCUMENTS

| EP | 0 429 677 B1 | 8/1996 |
| FR | 2 425 627 | 12/1979 |
| GB | 2 021 261 | * 11/1979 |

* cited by examiner

*Primary Examiner*—Michael P Nghiem
(74) *Attorney, Agent, or Firm*—Oblon, Spivak, McClelland, Maier & Neustadt, L.L.P.

(57) ABSTRACT

The method for tracking deformation of a metal part subjected to a pressure force (F) includes the steps of measuring the displacement (d) of the metal part in the deformation zone, of measuring the intensity of the pressure force (F), of calculating, during a first period, the constant ratio ($\alpha$) between the intensity of the pressure force (F) and the displacement (d) of the metal part, and of determining, during a second period, displacement values ($d_e$) and ($d_p$) related respectively to an elastic deformation and to a plastic deformation of the metal part from the constant ratio ($\alpha$) and a displacement ($d_a$) measured during the said second period.

11 Claims, 2 Drawing Sheets

PROCESS AND DEVICE FOR CONTROLLING THE DEFORMATION OF A METAL PART, IN PARTICULAR FOR REDRESSING A METAL PART

BACKGROUND OF THE INVENTION

1. Field of the Invention

The present invention relates to a method for tracking deformation of a metal part.

Correspondingly, it also relates to a device for tracking deformation of a metal part, suitable for implementing the method according to the invention.

In general, the present invention relates to the field of straightening or forming of a metal part.

2. Discussion of the Background

More particularly, it is applied to the straightening of aircraft parts, and especially parts of the structure of an aircraft.

In effect, as a result of residual stresses inherent to metal parts, such parts tend to become deformed during machining, thus necessitating an inverse deformation known as a straightening operation.

The straightening operations rely on the plastic deformation of a metal material. In effect, these materials have the property of undergoing irreversible deformation (permanent deformation) when they are subjected to mechanical stresses beyond a certain stress level known as the "elastic limit".

In general, a press imposing what is known as "three-point" bending is used to achieve these straightening operations on large-size machined parts. In this way, the metal part to be deformed is held in place at two points, a pressure force being applied at a third point to produce permanent deformation of the part to be straightened.

When the pressure force is applied to the metal part, the deformation achieved frequently goes beyond the desired deformation, thus requiring the operator to perform an inverse straightening operation.

This leads to considerable straightening times, possibly to rupture of metal parts and above all to introduction of excessive residual stresses that may alter the fatigue strength of the metal parts and their ability to adapt during their subsequent use.

SUMMARY OF THE INVENTION

The objective of the present invention is to overcome the aforesaid disadvantages and to provide a method and a device for tracking deformation of a metal part, allowing the quantity of deformation applied to that metal part to be controlled.

To this end, the present invention relates, according to a first aspect, to a method for tracking deformation of a metal part subjected to a pressure force, comprising the following steps:

measuring the displacement of the metal part in a deformation zone;

measuring the intensity of the pressure force exerted on a zone of application of the pressure force;

calculating, during a first period of the deformation operation, the constant ratio between the intensity of the pressure force and the displacement of the metal part; and determining, during a second period of the deformation operation, a displacement value related to an elastic deformation of the metal part and a displacement value related to a plastic deformation of the metal part from the said constant ratio and the displacement measured during the said second period of the deformation operation.

Thus, by virtue of simultaneously tracking the intensity of the pressure force applied to the metal part and the displacement of the metal part in response to application of the said force, it is possible to track the relative evolution of the intensity of the force and of the displacement of the metal part. From the ratio between these two values, during a first period, the elastic behavior of the metal part being subjected to the pressure force is identified and the constant ratio, which corresponds to a linear portion of the curve of displacement as a function of the exerted pressure force, is calculated. In this way it is then possible, during a second period, to separate the portion of displacement related to the elastic deformation of the metal part and the portion of displacement related to the plastic deformation of the metal part.

According to a practical characteristic of the invention, the method for tracking deformation comprises a step of determining the end of the first period of the deformation operation when the calculated ratio between the intensity of the pressure force and the displacement of the metal part is no longer constant and a step of emitting a warning signal intended for an operator and capable of indicating the start of plastic deformation of the metal part. In effect, when the calculated ratio varies, it corresponds to the onset of plastic deformation of the part.

Thus the operator can be informed about the moment at which the load on the metal part causes permanent deformation of the part.

In practice, the method comprises a step of acquiring an index value for permanent deformation of the metal part, of comparing the displacement value related to a plastic deformation of the metal part with the index value of permanent deformation, and of stopping the deformation operation when the displacement value related to plastic deformation of the metal part is equal to the index value of permanent deformation.

In this way it is possible to control the quantity of permanent deformation introduced into the metal part in reliable manner, and no longer in empirical manner, as in the prior art straightening techniques.

Furthermore, the method for tracking deformation can additionally comprise a step of acquiring a limit value of deformation of the metal part, of comparing the measured displacement of the metal part with the limit value, and of stopping the deformation operation when the displacement of the metal part is equal to the limit value.

In this way, the operation of deformation of the metal part is stopped automatically before the risk of rupture of the part becomes too great.

Correspondingly, the present invention also relates to a device for tracking deformation of a metal part, comprising:

means for measuring the displacement of the metal part in a deformation zone;

means for measuring the intensity of the pressure force exerted on a zone of application of the pressure force;

means for calculating, during a first period of the deformation operation, the constant ratio between the intensity of the pressure force and the displacement of the metal part; and means for determining, during a second period of the deformation operation, a displacement value related to an elastic deformation of the metal part and a displacement value related to a plastic deformation of the metal part from the constant ratio and the displacement measured during the second period of the deformation operation.

The device for tracking deformation additionally comprises means for emitting a warning signal intended for an operator and capable of indicating the start of plastic deformation of the metal part.

This device for tracking deformation has characteristics and advantages analogous to those described in the foregoing with regard to the method.

Finally, the present invention also relates to a tool for straightening or forming a metal part, comprising a jack capable of exerting a pressure force on a zone of the metal part, this straightening or forming tool being associated with a device according to the invention for tracking deformation.

The present invention is also aimed at the use of the method according to the invention for tracking deformation of a metal part for straightening or forming of that metal part.

In particular, the method according to the invention for tracking deformation of a metal part is used for straightening a part of the structure of an aircraft.

BRIEF DESCRIPTION OF THE DRAWINGS

Other special features and advantages of the invention will become more apparent in the description hereinafter.

In the attached drawings, given by way of non-limitative examples.

DETAILED DESCRIPTION OF THE PREFERRED EMBODIMENTS

Figure 1:
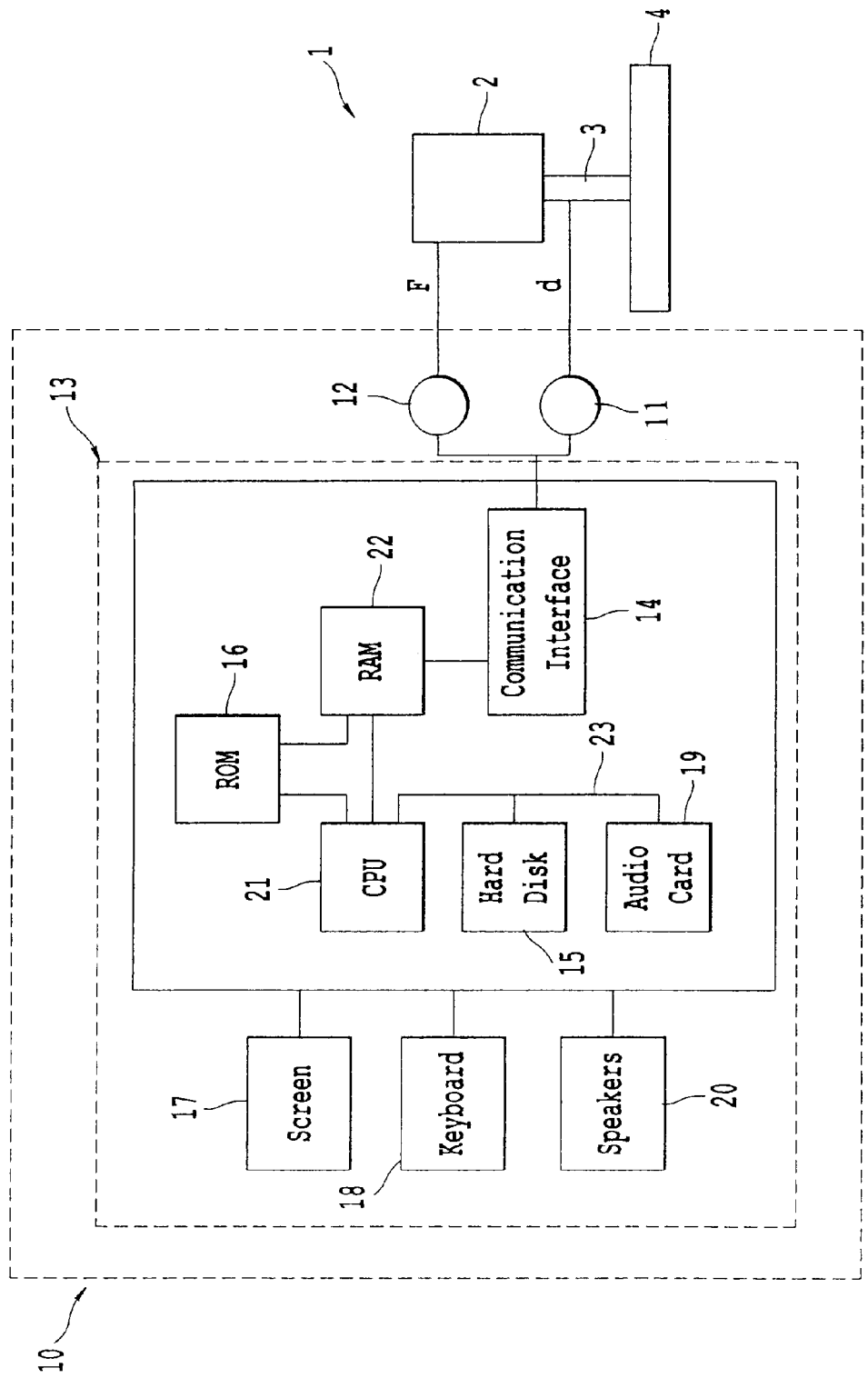
FIG. 1 is a diagram illustrating a tool for deformation of a metal part associated with a device according to the invention for tracking deformation.

In FIG. 1 there is illustrated an embodiment of the invention provided with a tool 1 for deforming a metal element 4 and a device 10 for tracking deformation.

Deformation tool 1 is typically a jack 1 suitable for applying a pressure force on a metal element 4. Jack 1 can be, for example, of hydraulic, pneumatic or electric type, and comprises a fixed part or jack body 2 and a mobile part or ram 3.

The example of FIG. 1 illustrates a jack 1 exerting a pressure force in vertical direction.

Device 10 for tracking deformation of a metal part 4 comprises measuring means 11, 12 as well as means for calculating and tracking deformation operation 13, implementing a method that will be described later in this document.

In particular, it comprises means 11 for measuring the displacement of metal part 4 in a deformation zone. In the present case, this deformation zone coincides with the zone of application of the pressure force.

Thus the displacement (denoted as d in FIG. 1) of metal part 4 is measured by a first sensor 11, which measures the displacement of ram 3 of the jack by means of an incremental display unit (not illustrated in the figure). The sensor can be an optical sensor or an incremental rotary encoder.

By way of example, the rotary encoder used can be a series ERN sensor of the Heidenhain company.

The incremental display unit displays the value of the displacement of ram 3 obtained by the rotary encoder and, by way of example, increments its value by one point per 0.1 mm of displacement of ram 3.

The device also comprises means 12 for measuring the intensity of the pressure force (denoted as F in FIG. 1) exerted in the zone of application.

The intensity of the pressure force is measured by a second sensor 12, such as a pressure-transmitting sensor of the Danfoss company.

This sensor delivers, for example, an analog signal corresponding to the measured hydraulic pressure.

By way of indication, the analog signal can have values of 4 to 20 mA or of 0 to 10 volts.

Device 10 for tracking deformation is also provided with means 13 for calculating the ratio between the intensity of the applied pressure force F and the displacement d of metal part 4, as well as means 13 for determining the different periods of the deformation operation, as described hereinafter.

Device 10 for tracking deformation is provided, for example, with a microcomputer 13 associated with sensors 11, 12 measuring the displacement d of metal part 4 and the intensity of the pressure force F exerted by deformation tool 1.

Microcomputer 13 is provided with a communication interface 14 connected to sensors 11, 12, capable of transmitting data to be processed or inversely of transmitting data processed by the device.

Thus the device for tracking deformation receives, via communication interface 14, and by means of sensors 11, 12, data originating from deformation tool 1, such as the measured value of the intensity of the pressure force F and a measured value of the displacement d of metal part 4.

The device is also provided with a storage means, such as a hard disk 15, which can contain data processed according to the invention as well as the program or programs implementing the invention. The program that enables the device to implement the invention can be stored in permanent memory 16 (denoted as ROM or Read Only Memory in FIG. 1).

This same device possesses a screen 17 for visualizing the relative evolution of intensity of the pressure force F and of the displacement d of metal part 4, and thus for obtaining knowledge about the period of the deformation operation that is currently in progress.

Device 10 is also provided with a keyboard 18 or any other means of acquiring parameters, making it possible, for example, to introduce an index value of deformation of metal part 4 and a limit value of deformation of metal part 4.

The device is also provided with sound-reproduction means, such as an audio card 19 and speakers 20, in order to emit a warning signal intended for an operator and suitable, for example, for indicating the start of plastic deformation of the metal part.

Central unit 21 (denoted as CPU in FIG. 1) executes the instructions relating to implementation of the method of the invention, which instructions are stored in the read-only memory or in the other storage means. When the power is on, the processing programs stored in a non-volatile memory such as the ROM are transferred into read-write memory 22 (denoted as RAM or Random Access Memory), which will then contain the executable code of the invention as well as the registers for storage in memory of the variables necessary for implementation of the invention.

Thus central unit 21 can issue the instruction for automatic stop of the deformation operation when the value of the displacement d is equal to particular values, which will be presented in detail hereinafter.

More generally, an information-storage means that can be read by a computer or microprocessor, that may or may not be integrated in the device and that may be removable, stores in its memory a program implementing the method according to the invention.

Communication bus 23 permits communication among the different elements included in microcomputer 13 or connected thereto. The representation of bus 23 is not limitative, and, in particular, central unit 21 is capable of communicating instructions to any element of microcomputer 13 directly or by way of another element of microcomputer 13.

Figure 2:
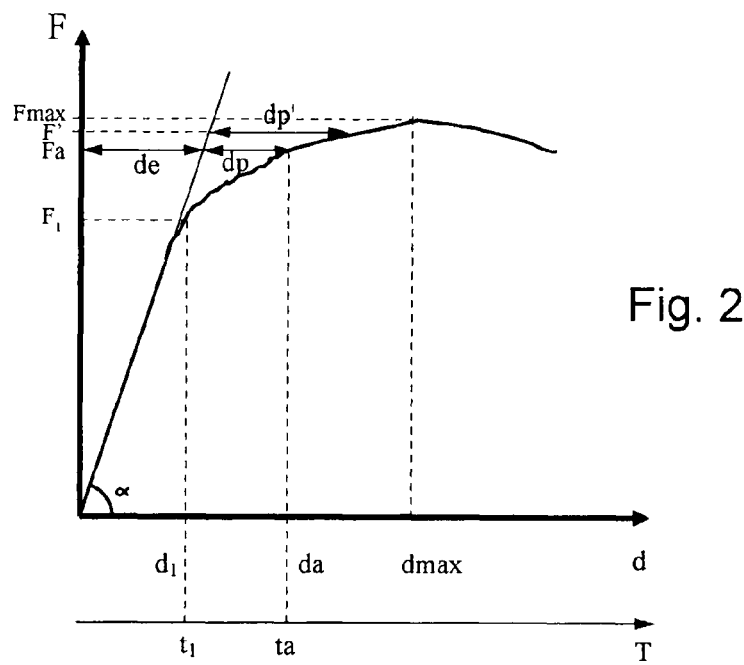
FIG. 2 is a diagram illustrating an example of a curve of displacement of a metal part in a zone of deformation as a function of the intensity of this pressure force.

Referring now to FIG. 2, there will be described the method for tracking deformation of a metal part.

The curve represents the displacement d of metal part 4 in a deformation zone, in this case coinciding with the zone of application of the pressure force, as a function of the intensity of pressure force F being exerted.

The intensity of pressure force F being exerted on metal part 4 is represented on the vertical axis and displacement of metal part 4 in the zone of application of the pressure force is represented on the horizontal axis.

Parallel to the horizontal axis, there is illustrated an axis T representative of time.

The method for tracking deformation of a metal part is composed globally of the steps described hereinafter.

The method begins with a step of measurement of the displacement d of the metal part and of the intensity of the pressure force F being exerted, followed by a step of calculation of the ratio (denoted as a in FIG. 2) between the intensity of the pressure force and the displacement of the metal part. This ratio α is constant during a first part of the deformation operation, corresponding to the linear portion of the curve.

The constant ratio α is calculated by the following relationship:

$$\alpha = \frac{F1}{d1}$$

The end of the first period of the deformation operation is determined when the calculated ratio between the intensity of the pressure force and the displacement of the metal part is no longer constant. The end of this first period or period in which the displacement corresponds only to an elastic deformation of the part, is represented by the coordinate point $(d_1, F_1)$, which corresponds to the time instant $t_1$.

In practice, the values F and d are measured periodically and the associated ratio α is calculated. The comparison of the calculated ratios α over time makes it possible to determine the instant $t_1$ at which this ratio α becomes variable.

At that instant $t_1$, a warning signal suitable for indicating the start of plastic deformation of the metal part is emitted to an operator.

Typically, the end of this first period of the deformation operation corresponds to a value of 15 mm for the displacement d of the metal part and to a maximum value of 125 metric tons for the intensity of the pressure force.

Starting from that time instant $t_1$, a second period of the deformation operation begins, during which plastic deformation of the part takes place.

This portion of the curve has one component related to the elastic deformation and another component related to the plastic deformation. For example, the intensity of the pressure force $F_a$, greater than the value $F_1$, produces a certain displacement of the metal part $d_a$, where $d_a$ is composed of the displacement related to the elastic deformation $d_e$ of metal part 4 and of the displacement related to the plastic deformation $d_p$ of metal part 4. The displacement measured at a time instant $t_a$ is then defined by the following equation:

$$d_a = d_e + d_p$$

Now $$d_e = \frac{F_a}{\alpha}$$

$$d_a = \frac{F_a}{\alpha} + d_p$$

The portion $d_p$ of the displacement related to the plastic deformation can then be calculated from the formula:

$$d_p = d_a - \frac{F_a}{\alpha}$$

The method also includes a step of acquisition of an index value $d_p'$ of permanent deformation of the metal part and of a limit value $d_{max}$ of deformation of metal part 4.

At the start of the deformation operation, the operator can acquire an index value $d_p'$ of permanent deformation and a limit value $d_{max}$ of deformation in device 10 for tracking deformation. These values can vary as a function of the materials of which the part is composed and of the straightening or forming configuration. The straightening or forming configuration comprises, for example, the type of straightening or forming ("three-point" bending, untwisting, etc.), the distances between the points at which metal part 4 is held in place and the point of application of the pressure force, and the inertias and thicknesses in the straightening or forming zone.

The value of displacement $d_p$ related to a plastic deformation of metal part 4 is compared with the index value $d_p'$ of permanent deformation. Following this comparison, the deformation operation is stopped when the value of displacement $d_p$ related to plastic deformation of the metal part is equal to the index value $d_p'$ of permanent deformation.

In addition, the measured displacement $d_a$ of metal part 4 is compared with the limit value $d_{max}$ of deformation, and the deformation operation is stopped when the displacement d of metal part 4 is equal to the limit value $d_{max}$.

By way of illustrative example, the limit value $d_{max}$ of deformation is equal to 17 mm, which in this example corresponds to a limit value of approximately 125 metric tons for the intensity of the pressure force $F_{max}$ being exerted.

These values are obtained from experience on a tee and on a cross of an Airbus A380.

Figure 3:
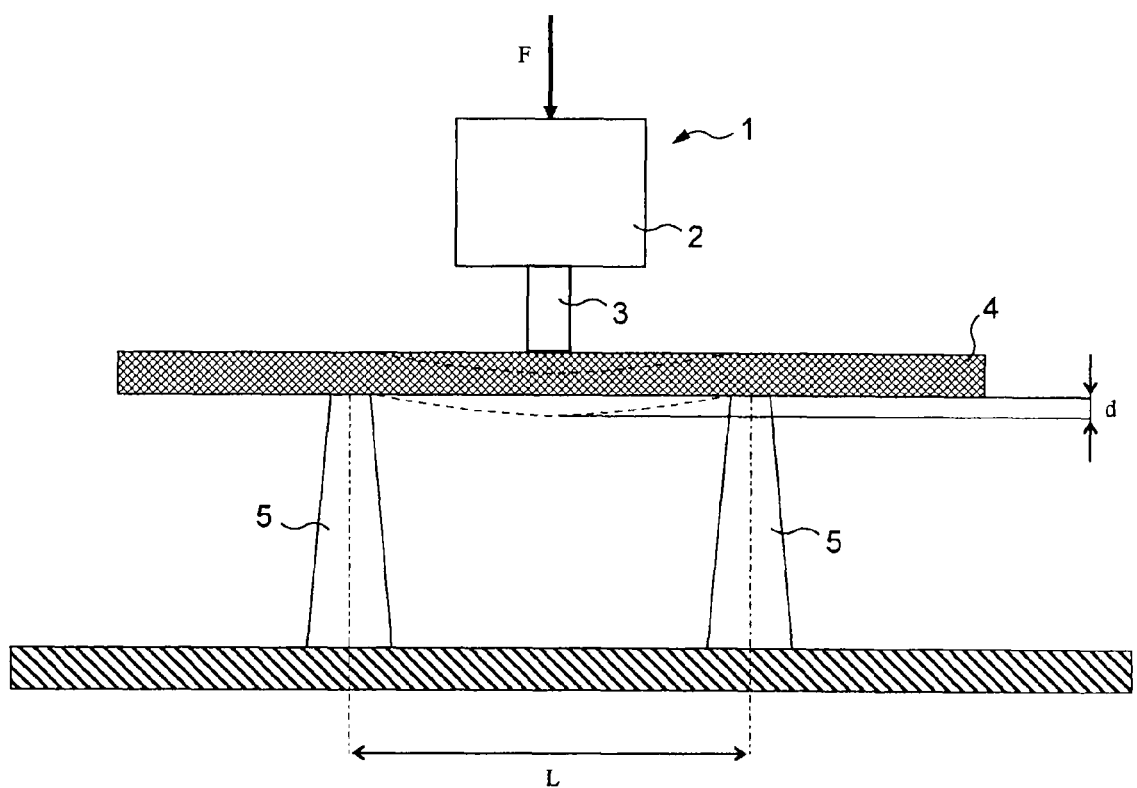
FIG. 3 is a diagram illustrating the use of the tool of FIG. 1 for straightening an aircraft wing.

Referring to FIG. 3, there will be described an example of use of the device and method according to the invention for tracking deformation.

Metal part 4, such as a wing, to be deformed or straightened is an iron junction brace of the wing unit of an Airbus A380. Wing 4 is placed and fixed on two blocks 5, the blocks 5 being situated at a distance L from one another. A representative value of the distance L can be 300 mm.

Metal part 4 to be deformed or straightened is an iron junction brace of a wing unit of an Airbus A380. Wing 4 is placed and fixed on two blocks 5, the blocks 5 being situated at a distance L from one another. A representative value of the distance L can be 300 mm.

A jack 1 is situated above wing 4 in such a way that a pressure force F is applied in the vertical direction, perpendicular to wing 4, over a zone of application that can be situated substantially midway between blocks 5.

By way of non-limitative example, the jack is a safety-catch jack 1 provided with a ram 3 of 370 mm diameter.

The deformation of wing 4 is measured by the displacement d of ram 3 of jack 1. By way of example, when the displacement d has a value of 15.8 mm, 15 mm is related to the elastic deformation $d_e$ and 0.8 mm is related to the plastic deformation $d_p$ for an applied pressure force F having an intensity of 125 metric tons.

By way of example, the pressure-force intensity of 125 metric tons in reality represents 100 metric tons exerting an effective pressure force F, the remaining 25 metric tons corresponding to a safety margin.

Obviously jack 1 can be situated in such a way that the pressure force F is applied over a zone of application outside the zone of wing 4 situated between the two blocks 5.

Of course, numerous modifications can be made to the exemplary embodiment described in the foregoing, without going beyond the scope of the invention. In particular, the described device and method for tracking deformation of a metal part can be used for forming operations in addition to straightening operations.

In addition, the device for tracking deformation can be connected to a plurality of jacks. The jacks can be connected in a network or can be independent of one another.

The invention claimed is:

1. A method for tracking deformation of a metal part subjected to a pressure force (F), wherein said method comprises the following steps:
   measuring a displacement (d) of the metal part in a deformation zone;
   measuring an intensity of the pressure force (F) exerted on a zone of application of said pressure force (F);
   calculating, during a first period of a deformation operation, a ratio ($\alpha$) between the intensity of the pressure force (F) and the displacement (d) of the metal part, said ratio ($\alpha$) being constant during said first period of the deformation operation; and
   determining, with a processor, during a second period of the deformation operation, a displacement value ($d_e$) related to an elastic deformation of the metal part and a displacement value ($d_p$) related to a plastic deformation of the metal part from said ratio ($\alpha$) and a displacement ($d_a$) measured during said second period of the deformation operation.

2. A method for tracking deformation according to claim 1, further comprising the following steps:
   acquiring an index value ($d_p'$) for permanent deformation of the metal part;
   comparing the displacement value ($d_p$) related to a plastic deformation of the metal part with said index value ($d_p'$) of permanent deformation; and
   stopping the deformation operation when said displacement value ($d_p$) related to plastic deformation of the metal part is equal to the said index value ($d_p'$) of permanent deformation.

3. A method for tracking deformation according to claim 1, further comprising the following steps:
   acquiring a limit value ($d_{max}$) of deformation of the metal part;
   comparing the measured displacement ($d_a$) of the metal part with said limit value ($d_{max}$); and
   stopping the deformation operation when said displacement ($d_a$) of the metal part is equal to said limit value ($d_{max}$).

4. A method for straightening or forming of a metal part, wherein said method comprises the steps of the method of claim 1, and further comprises straightening or forming said metal part.

5. The method according to claim 1, wherein said metal part is part of an aircraft.

6. A method for tracking deformation of a metal part subjected to a pressure force (F), wherein said method comprises the following steps:
   measuring a displacement (d) of the metal part in a deformation zone;
   measuring an intensity of the pressure force (F) exerted on a zone of application of said pressure force (F);
   calculating, during a first period of a deformation operation, a ratio ($\alpha$) between the intensity of the pressure force (F) and the displacement (d) of the metal part, said ratio ($\alpha$) being constant during said first period of the deformation operation; and
   determining, with a processor, during a second period of the deformation operation, a displacement value ($d_e$) related to an elastic deformation of the metal part and a displacement value ($d_p$) related to a plastic deformation of the metal part from said ratio ($\alpha$) and a displacement ($d_a$) measured during said second period of the deformation operation;
   determining an end of said first period of the deformation operation when the calculated ratio ($\alpha$) between the intensity of the pressure force (F) and the displacement ($d_a$) of the metal part is no longer constant; and
   emitting a warning signal intended for an operator and capable of indicating the start of plastic deformation of the metal part.

7. A device for tracking deformation of a metal part subjected to a pressure force (F), wherein said device comprises:
   means for measuring a displacement of the metal part in a deformation zone;
   means for measuring the an intensity of the pressure force (F) exerted on a zone of application of said pressure force (F);
   means for calculating, during a first period of a deformation operation, a ratio ($\alpha$) between the intensity of the pressure force (F) and the displacement (d) of the metal part, said ratio ($\alpha$) being constant during said first period of the deformation operation; and
   means for determining, during a second period of the deformation operation, a displacement value ($d_e$) related to an elastic deformation of the metal part and a displacement value ($d_p$) related to a plastic deformation of the metal part from said ratio ($\alpha$) and a displacement ($d_a$) measured during said second period of the deformation operation.

8. A device for tracking deformation according to claim 7, further comprising means for emitting a warning signal intended for an operator and capable of indicating the start of plastic deformation of the metal part.

9. A device for tracking deformation according to claim 7, further comprising means for issuing an instruction for automatically stopping the deformation operation when the displacement value ($d_p$) related to plastic deformation of the metal part is equal to an index value ($d_p'$) of permanent deformation or when the displacement ($d_a$) of the metal part is equal to a limit value ($d_{max}$).

10. A tool for straightening or forming a metal part, comprising a jack capable of exerting a pressure force (F) on a zone of the metal part, wherein said tool includes a device according to claim 7 for tracking deformation.

11. The device according to claim 7, wherein said metal part is part of an aircraft.

* * * * *